United States Patent
Cain

[11] 3,737,193
[45] June 5, 1973

[54] WINDSHIELD EJECTOR FOR VEHICLES

[76] Inventor: Robert H. Cain, 510 Garner Road, Milford, Mich. 48042

[22] Filed: Oct. 22, 1971

[21] Appl. No.: 191,684

[52] U.S. Cl..................296/84 K, 49/141, 49/466, 244/129 W
[51] Int. Cl. ..............................B60j 1/02
[58] Field of Search ..................296/84 R, 84 K; 49/141, 466, 477; 244/119, 121, 122 AF, 129 W; 89/1 B; 292/DIG. 65

[56] References Cited
UNITED STATES PATENTS

| | | | |
|---|---|---|---|
| 1,793,370 | 2/1931 | Maehren | 296/84 K |
| 3,486,410 | 12/1969 | Drexelius et al. | 89/1 B |
| 2,834,606 | 5/1958 | Bertrand | 280/150 AB |
| 3,442,048 | 5/1969 | Elias | 49/141 |
| 3,454,245 | 7/1969 | Burkdoll et al. | 244/119 |
| 2,701,899 | 2/1955 | Krupp | 244/129 W X |
| 2,731,220 | 1/1956 | Power | 244/121 |
| 3,642,303 | 2/1972 | Irish et al. | 280/150 AB |

FOREIGN PATENTS OR APPLICATIONS 1,113,563  5/1968  Great Britain..........................49/141

Primary Examiner—Leo Friaglia
Assistant Examiner—Leslie J. Paperner
Attorney—Robert A. Sloman

[57] ABSTRACT

A windshield mounting assembly for vehicles which includes a continuous outwardly opening channel at the windshield opening peripherally supporting and holding a windshield. A high pressure expansion tube is nested in the channel and connected to a pressure fluid reservoir, controlled by a preset impact sensor to expand and eject the windshield.

2 Claims, 4 Drawing Figures

PATENTED JUN 5 1973 3,737,193
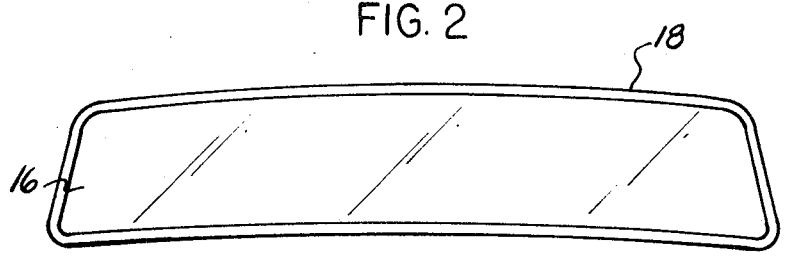
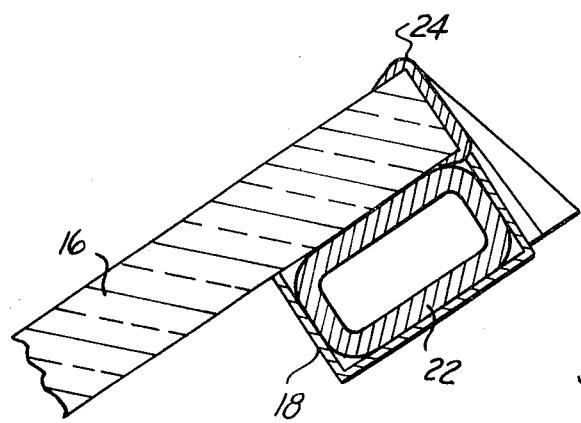
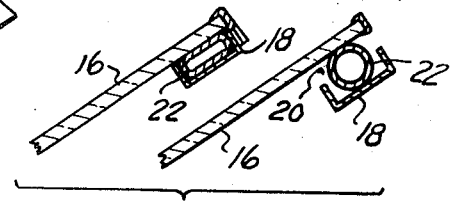
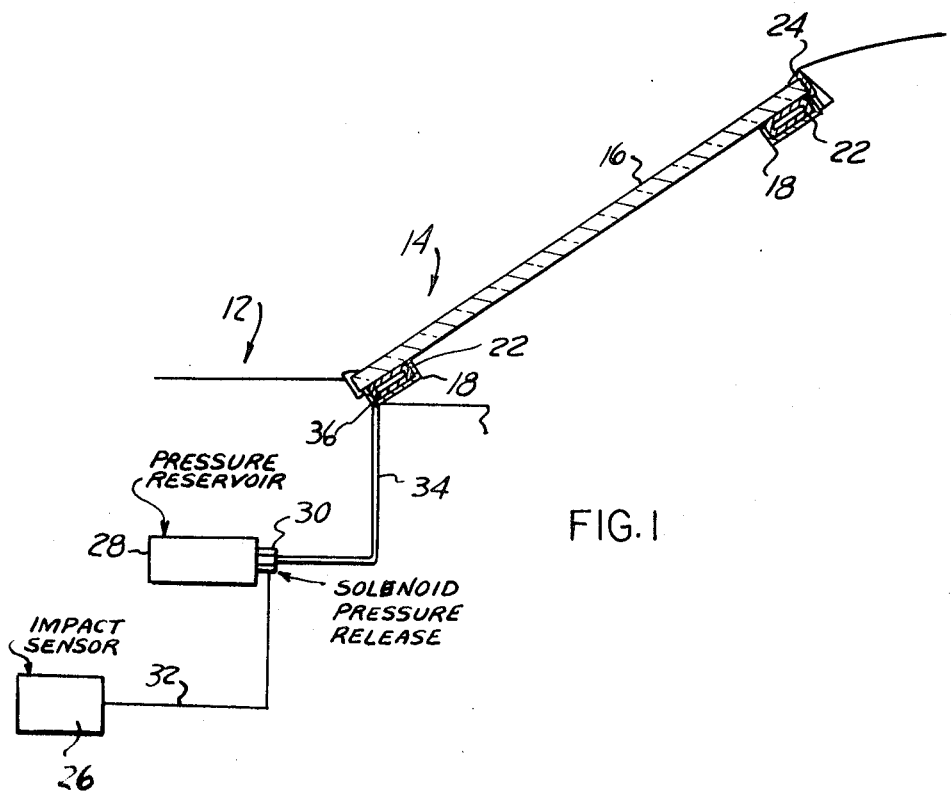

WINDSHIELD EJECTOR FOR VEHICLES

BACKGROUND OF THE INVENTION

Heretofore, there have been provided windshield assemblies for minimizing hazards to passengers from sudden impacts and, wherein, mechanism is provided by which the windshield may be mechanically disengaged with a limited force from its mounting for disassembly from the vehicle. In many of these constructions, physical force of the passenger's body or head is required for disengaging said windshield which has resulted in injury to the passenger.

Various mechanisms have beem employed for mounting the windshield upon and within a windshield assembly in such a manner as to facilitate its removal from the windshield mounting in the event of accidents. However, in such cases, some mechanical force usually provided by the human body is required.

BRIEF DESCRIPTION OF THE INVENTION

It is an object of the present invention to provide a windshield ejector which overcomes these difficulties and provides a means by which upon impact, the windshield is automatically and mechanically ejected from the windshield opening so as not to be in the path of forward movement of any passenger not otherwise anchored in his seat.

It is another object to provide a windshield mounting which includes a normally inactive expansion tube which peripherally engages the windshield which is otherwise sealed upon the windshield assembly, but which upon impact of a predetermined amount, will be inflated by the release of pressure fluid from a reservoir, to shear the windshield seal and eject the windshield.

These and other objects will be seen from the following specification and claims in conjunction with the appended drawing.

THE DRAWING

In the drawing:

FIG. 1 is a schematic side view of the present windshield ejector including power and control mechanism.

FIG. 2 is a front elevational view of the windshield assembly.

FIG. 3 is a fragmentary cross-sectional view of a portion of the present windshield ejector assembly of FIG. 1, but on an increased scale.

FIG. 4 are fragmentary side sectional views corresponding to FIG. 3 illustrating the normal assembled position and the expansion position of the parts.

DETAILED DESCRIPTION OF THE INVENTION

Referring to the drawing, the present windshield ejector assembly is generally shown in FIG. 1 as mounted within a vehicle body fragmentarily shown at 12 and which has the conventional windshield opening to receive windshield assembly 14.

Windshield 16 is normally nested and retained and sealed within the windshield mounting means provided at the windshield opening in the vehicle body and which includes a continuous outwardly opening tube retainer channel 18. Said channel is affixed to the body along the periphery of and inwardly of the windshield opening.

Said channel opens outwardly as at 20 and has nested therein throughout its continuous length throughout 360° high pressure expansion tube 22 which in unexpanded form, is normally nested entirely within the tube retainer channel as shown in FIG. 3.

The rear peripheral edge portion of the windshield is mounted and nested within the windshield mounting means and bears against tube retainer channel 18, is in registry with the normally collapsed expansion tube 22 and is suitably sealed with respect to the windshield mounting means as at 24.

Thus, the windshield 16 is normally anchored within the windshield mounting means by means of a conventional wedge, shear or pressure seal, as at 24 which is sufficient for anchoring and retaining the windshield upon the windshield body and within or upon the windshield mounting means.

As shown in FIG. 1, an impact sensor 26 is mounted upon the vehicle body and is preset for a determined amount of impact. Various types of impact sensors are available on the market which will respond to sudden impacts to provide a signal. Accordingly, in the present disclosure, there is omitted a specific description of the particular impact sensor which may electronically or otherwise respond to a predetermined amount of impact sending a signal for controlling the safety mechanism.

In the present construction, there is provided a pressure fluid reservoir for storing compressed air or carbon dioxide and which is associated with the vehicle in such a manner as to provide a continuous pressure of fluid therein.

The reservoir 28 includes a pressure release mechanism generally indicated at 30 and which is connected to the impact sensor by the electric conduit 32.

In the present illustrative embodiment, the pressure release mechanism is in the form of a solenoid controlled valve 30 whose outlet communicates with the high pressure expansion tube 22 by the conduit 34 which is connected thereto at 36.

OPERATION

In operation upon impact of an amount for which the impact sensor has been preset, said sensor signals or energizes the pressure release mechanism which in the present case is the solenoid controlled valve 30. Compressed air or the like stored within reservoir 28 is released to pass through the high pressure conduit 34 and into expansion tube 22.

Said expansion tube is restricted by the tube retainer channel 18 so that it may expand outwardly only against the windshield peripherally thereof, thus, shearing its seal and forcing the windshield out of the windshield mounting assembly ejecting the same.

It is contemplated that the pressure reservoir or tank 28 normally store compressed air. Any suitable means may be provided for maintaining a predetermined pressure head within said reservoir, which may be compressor mechanism driven by the vehicle engine. The structure and detail of such mechanism is omitted herein since it is a conventional construction. It is important, however, merely that the tank 28 is adapted to maintain the pressure fluid such as compressed air and at a suitable pressure such that it will be capable of expanding the tube 22 for forceful ejection of the windshield 16 with such force as will disengage the windshield from its seal 24. For illustration, pressure maintained in said reservoir would be in the area of 20–50 pounds per square inch, for illustration.

Having described my invention, reference should now be had to the following claims.

I claim:

1. A windshield ejector for a vehicle having a body with a windshield opening;
   a windshield mounting means including a continuous outwardly opening tube retainer channel mounted on said body along the periphery and inwardly of said windshield opening;
   a continuous high pressure expansion tube nested within said channel adapted on inflation to expand outwardly of said channel;
   a windshield peripherally nested and sealed in said windshield mounting means and bearing against said channel;
   a fluid pressure reservoir on the body and a normally closed pressure release valve located in a high pressure conduit interconnecting said fluid pressure reseroir and said expansion tube;
   and an impact sensor on the body connected to said pressure release valve, preset for a determined amount of impact, adapted on such impact to actuate said pressure release valve to open said valve, releasing pressure fluid from the reservoir and expanding said tube against said windshield and ejecting said windshield from said windshield mounting means.

2. In the windshield ejector of claim 1, said windshield mounting means including a peripheral wedge, shear or pressure seal peripherally engaging the windshield.

* * * * *